US008278809B2

(12) United States Patent
Kurono et al.

(10) Patent No.: US 8,278,809 B2
(45) Date of Patent: Oct. 2, 2012

(54) SPARK PLUG WITH ALUMINA-BASED INSULATOR

(75) Inventors: Hirokazu Kurono, Nagoya (JP); Toshitaka Honda, Nagoya (JP); Katsuya Takaoka, Komaki (JP); Hiroki Takeuchi, Niwa-gun (JP); Kuniharu Tanaka, Komaki (JP); Takeshi Mitsuoka, Kounan (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 0 days.

(21) Appl. No.: 13/257,709

(22) PCT Filed: Mar. 9, 2010

(86) PCT No.: PCT/JP2010/001655
§ 371 (c)(1),
(2), (4) Date: Sep. 20, 2011

(87) PCT Pub. No.: WO2010/109792
PCT Pub. Date: Sep. 30, 2010

(65) Prior Publication Data
US 2012/0007489 A1 Jan. 12, 2012

(30) Foreign Application Priority Data

Mar. 26, 2009 (JP) .................................. 2009-076085
Jul. 3, 2009 (JP) .................................. 2009-159331

(51) Int. Cl.
*F02M 57/06* (2006.01)
*H01T 13/20* (2006.01)
(52) U.S. Cl. .................. 313/141; 313/118; 313/137
(58) Field of Classification Search .................. None
See application file for complete search history.

(56) References Cited

U.S. PATENT DOCUMENTS

| 7,022,636 | B2 * | 4/2006 | Hamada et al. ............... 501/152 |
| 7,598,661 | B2 * | 10/2009 | Walker, Jr. .................... 313/129 |
| 8,183,754 | B2 * | 5/2012 | Kuribayashi et al. ......... 313/118 |
| 2003/0087751 | A1 | 5/2003 | Hamada et al. |
| 2006/0186780 | A1 | 8/2006 | Ogata et al. |
| 2008/0124266 | A1 | 5/2008 | Ogata et al. |

FOREIGN PATENT DOCUMENTS

| EP | 1005125 A2 | 5/2000 |
| JP | 2000-272957 A | 10/2000 |
| JP | 2000-313657 A | 11/2000 |
| JP | 2001-002464 A | 1/2001 |
| JP | 2001-335360 A | 12/2001 |
| JP | 2003-112964 A | 4/2003 |
| JP | 2008-127263 A | 6/2008 |
| WO | WO 2005-033041 A1 | 4/2005 |

OTHER PUBLICATIONS

International Search Report mailed Jun. 15, 2010 for the corresponding PCT patent application No. PCT/JP2010/001655.

* cited by examiner

*Primary Examiner* — Natalie Walford
(74) *Attorney, Agent, or Firm* — Leason Ellis LLP

(57) ABSTRACT

A spark plug exhibits a satisfactory withstand voltage characteristic and sufficient mechanical strength in a high temperature environment exceeding 700° C. The spark plug has a center electrode, an insulator, and a ground electrode, characterized in that the insulator is formed of an alumina-based sintered material containing an Si component, a Group 2 element (2A) component, and a rare earth element (RE) component; that the alumina-based sintered material has an RE-β-alumina crystal phase; and that the mean crystal grain size $D_A(RE)$ of the RE-β-alumina crystal phase and that of alumina $D_A(Al)$ satisfy the following relationship (1):

$$0.2 \leq D_A(RE)/D_A(Al) \leq 3.0.$$

22 Claims, 3 Drawing Sheets

SPARK PLUG WITH ALUMINA-BASED INSULATOR

CROSS-REFERENCE TO RELATED PATENT APPLICATIONS

This application is a U.S. National Phase Application under 35 U.S.C. §371 of International Patent Application No. PCT/JP/2010/001655, filed Mar. 9, 2010, and claims the benefit of Japanese Patent Applications No. 2009-076085, filed Mar. 26, 2009 and No. 2009-159331 filed Jul. 3, 2009, all of which are incorporated by reference herein. The International Application was published in Japanese on Sep. 30, 2010 as International Publication No. WO/2010/109792 under PCT Article 21(2).

FIELD OF THE INVENTION

The present invention relates to a spark plug, and more particularly to a spark plug having an insulator which exhibits a satisfactory withstand voltage characteristic and sufficient mechanical strength in a high temperature environment exceeding, for example, 700° C.

BACKGROUND OF THE INVENTION

Alumina-based sintered material containing alumina as a predominant component is excellent in withstand voltage characteristic, heat resistance, mechanical strength, etc. and is an inexpensive material. Therefore, the sintered material is employed for producing ceramic products, such as a spark plug ceramic insulator (may be referred to simply as "insulator" in the specification) and a multi-layer wiring board of IC packages. Such alumina-based sintered material has been produced by sintering a powder mixture containing a sintering aid; e.g., a 3-component sintering aid represented by $SiO_2$—CaO—MgO.

When a spark plug insulator is produced from an alumina-based sintered material produced through sintering a raw material with the aforementioned 3-component sintering aid, after sintering, the sintering aid (mainly an Si component) remains at the grain boundary among alumina crystal grains as a low-melting-point glass phase. In this case, the low-melting-point glass phase is softened in a spark plug use environment, such as in a high temperature environment of about 700° C., impairing the withstand voltage characteristics of the insulator. The amount of low-melting-point glass phase in an alumina-based sintered material can be reduced by reducing the amount of the sintering aid added to the raw material. However, in this case, the insulator cannot be densified, or, even when the insulator has been apparently densified, a large number of pores remain in the grain boundary defined by alumina crystal grains, also impairing the withstand voltage characteristics of the insulator.

As described above, conventional alumina-based sintered materials include, at the grain boundaries, a low-melting-point glass phase or pores (residual pores). Thus, when a high voltage for generating spark discharge is applied to a spark plug having an insulator made therefrom in a high temperature environment (e.g., about 700° C.), the low-melting-point glass phase is softened, or the electric field is exclusively applied to the residual pores, possibly causing breakdown (penetration of spark) of the insulator.

For preventing such impairment in withstand voltage characteristic and/or breakdown, there have been proposed a spark plug insulator and a material thereof. For example, Japanese Patent Application Laid-Open (kokai) No. 2001-2464 discloses "a high-withstand-voltage alumina-based sintered material containing at least a rare earth element (hereinafter abbreviated as RE) component, characterized in that the alumina-based sintered material has a ratio of measured density to theoretical density of 95% or higher."

Japanese Patent Application Laid-Open (kokai) No. 2001-335360 discloses an insulator for a spark plug, characterized in that the insulator comprises an Al component in an oxide-converted amount of 95 to 99.8 mass % with respect to the total amount of the constitutional components as 100 mass %, and a rare earth element and an Si component in such amounts that the ratio ($R_{RE}/R_{Si}$) of oxide-converted rare earth element content ($R_{RE}$) to oxide-converted Si component content ($R_{Si}$) is adjusted to 0.1 to 1.0, and that a cross-section having an area of 1 mm² contains fewer than 10 alumina particles which have a longest size of 10 µm or longer and an aspect ratio of 3 or higher."

International Publication WO 05/033041 discloses "an alumina ceramic composition containing alumina as a predominant component, characterized in that the composition is a complex sintered material comprising alumina serving as the predominant component and at least one element selected from among Al, Si, Mg, and rare earth elements and that the amount of said at least one element selected from among Al, Si, Mg, and rare earth elements is 5 parts by weight or less with respect to 100 parts by weight of alumina serving as the predominant component."

Meanwhile, recent internal combustion engines to which a spark plug is attached are designed for a high-output mode or the like, and increase in area of an intake or an exhaust valve in a combustion chamber, employment of 4-valve configuration, etc. have been proposed. In this trend, downsizing (small-scale or small-diameter and thinning) of a spark plug itself and the insulator thereof is planned more and more. In addition, when such internal combustion engines have been designed for a high-output mode or the like, a spark plug, in particular an area surrounding the electrodes, is possibly exposed to high-temperature conditions which have never been experienced.

Therefore, it is important for such thinned insulators to have a satisfactory withstand voltage characteristic and mechanical strength not only in a high temperature (e.g., about 700° C.) environment but also in a higher temperature environment. However, no studies have been conducted for the spark plug insulator and the materials thereof disclosed in Patent All of references cited above have a satisfactory withstand voltage characteristic and mechanical strength in such a high temperature environment.

SUMMARY OF THE INVENTION

Problems to be Solved by the Invention

An object of the present invention is to provide a spark plug having an insulator which exhibits a satisfactory withstand voltage characteristic and sufficient mechanical strength in a high temperature environment exceeding, for example, 700° C.

Means for Solving the Problems

One means for solving the problems is (1) a spark plug comprising a center electrode, a generally cylindrical insulator surrounding the center electrode, and a ground electrode disposed such that one end of the ground electrode faces the center electrode via a spark discharge gap, characterized in that the insulator is formed of an alumina-based sintered material containing an Si component, a Group 2 element component, the Group included in the periodic table defined by Recommendations 1990 presented by the International Union of Pure and Applied Chemistry, or IUPAC (Group 2 may be referred to as Group 2A as previously defined by IUPAC, or as defined by the Chemical Abstracts Service (CAS)), and a rare earth element component (hereinafter may be referred to as an RE component);

that the alumina-based sintered material has an RE-β-alumina crystal phase containing at least the RE component; and that the mean crystal grain size $D_A(RE)$ of the RE-β-alumina crystal phase and that of alumina $D_A(Al)$ satisfy the following relationship (1): $0.2 \leq D_A(RE)/D_A(Al) \leq 3.0$.

Other means of the present invention are as follows:

(2) a spark plug as described in (1) above, wherein the alumina-based sintered material includes three or fewer RE-β-alumina crystal phase portions where the crystal grain size $D_E(RE)$ thereof and the mean crystal grain size of alumina $D_A(Al)$ satisfy the following relationship (2): $D_E(RE)/D_A(Al) \geq 2$;

(3) a spark plug as described in (1) or (2) above, wherein the RE-β-alumina crystal phase is represented by the following compositional formula: $RE(2A)_x(Al)_yO_z$ (wherein x is 0 to 2.5, y is 11 to 16, and z is 18 to 28);

(4) a spark plug as described in any one of (1) to (3) above, wherein, when the RE-β-alumina crystal phase is observed under a transmission electron microscope, a circular spot having a diameter of 0.3 nm in which the RE-β-alumina crystal phase is present contains an alkali metal component in an oxide-converted amount of 0.01 to 8 mass %;

(5) a spark plug as described in any one of (1) to (4) above, wherein the alumina-based sintered material is produced by mixing an alumina material and a secondary material formed of the Si component, the Mg component, the Group 2 element component, and the RE component in a slurry, molding the granulated product, and firing the member; and the particle size ratio of mean particle size of the alumina material contained in the slurry to that of the secondary material ($D_{alumina\ material}/D_{secondary\ material}$) satisfies the following relationship: $1.3 \leq (D_{alumina\ material}/D_{secondary\ material}) \leq 4$;

(6) a spark plug as described in any one of (1) to (5) above, wherein the 2A component contains Mg and Ba as essential elements among the Group 2 elements and at least one element other than Mg and Ba in the periodic table defined by Recommendations 1990, IUPAC, and the RE component is at least one member selected from the group consisting of an La component, a Pr component, and an Nd component; and (7) a spark plug as described in any one of (1) to (6) above, wherein the insulator is held by a metallic shell, and the metallic shell has, around the outer surface thereof, a screw portion having a nominal diameter of 10 mm or smaller.

EFFECTS OF THE INVENTION

As described above, the spark plug insulator of the present invention is formed of an alumina-based sintered material containing an Si component, a 2A component, and an RE component, and the alumina-based sintered material has an RE-β-alumina crystal phase containing at least the RE component, wherein the mean crystal grain size $D_A(RE)$ of the RE-β-alumina crystal phase and the mean crystal grain size $D_A(Al)$ of alumina satisfy the aforementioned relationship (1). When a spark plug has an insulator made from the alumina-based sintered material having such characteristics, the insulator exhibits a satisfactory withstand voltage characteristic and sufficient mechanical strength in a high temperature environment exceeding, for example, 700° C. Thus, the present invention enables provision of a spark plug having an insulator exhibiting a satisfactory withstand voltage characteristic and sufficient mechanical strength in a high temperature environment exceeding, for example, 700° C.

BRIEF DESCRIPTION OF THE DRAWINGS

These and other features and advantages of the present invention will become more readily appreciated when considered in connection with the following detailed description and appended drawings, wherein like designations denote like elements in the various views, and wherein:

FIGS. 1(a) and 1(b) are explanatory views showing a spark plug which is one example of the spark plug according to the present invention, wherein FIG. 1(a) is a partially-sectioned overall view of the spark plug which is one example of the spark plug according to the present invention, and FIG. 1(b) is a sectional view showing a main portion of the spark plug which is one example of the spark plug according to the present invention.

DETAILED DESCRIPTION OF THE INVENTION

Best Mode for Carrying Out the Invention

The spark plug according to the present invention includes a center electrode, a generally cylindrical insulator surrounding the center electrode, and a ground electrode disposed such that one end of the ground electrode faces the center electrode via a spark discharge gap. So long as the spark plug has the above-described structure, no particular limitation is imposed on the remaining structure of the spark plug according to the present invention, and any of various structures may be employed.

Figure 1:
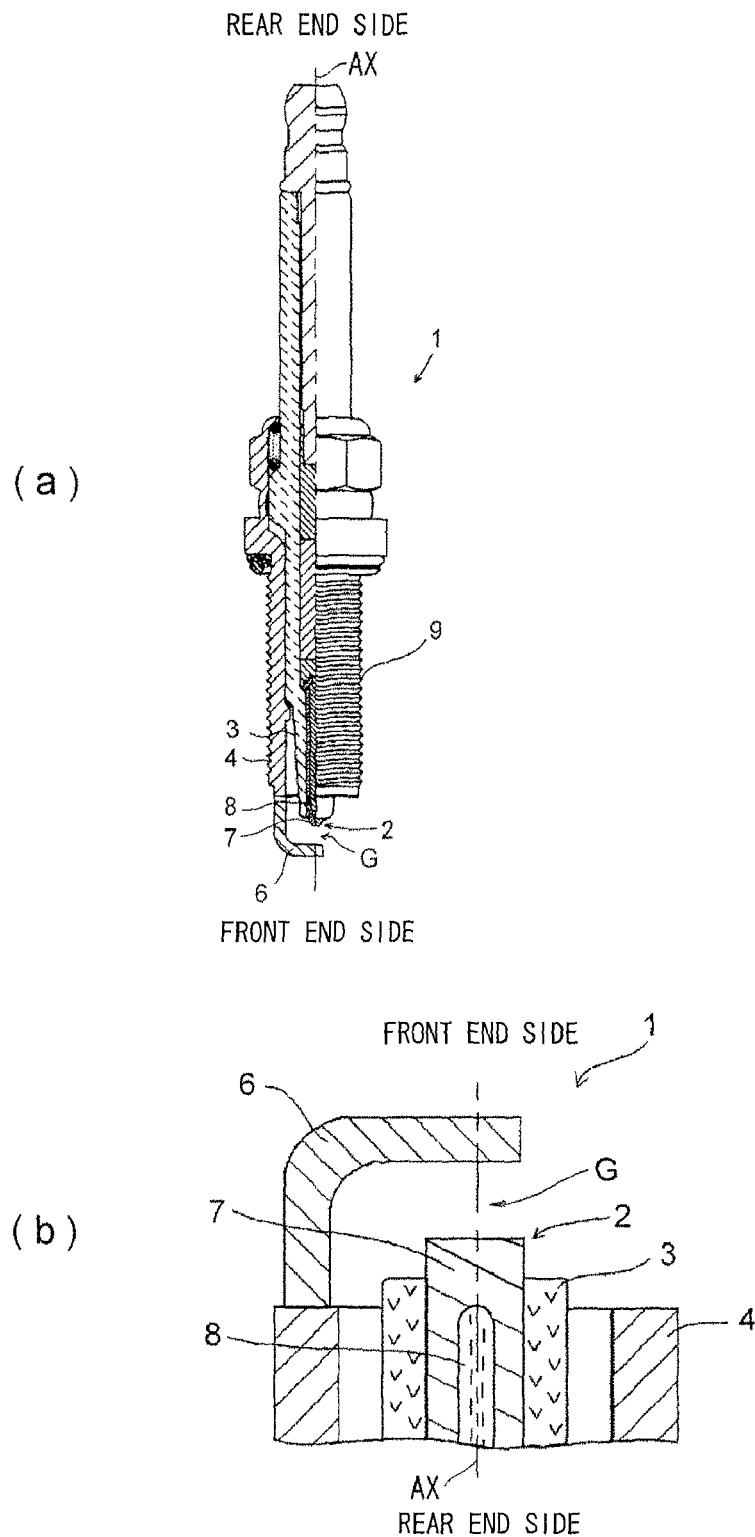

FIGS. 1(a) and 1(b) show a spark plug which is one example of the spark plug according to the present invention. In the following description, the lower side of FIG. 1(a) will be referred to as the front end side with respect to the direction of an axis AX, and the upper side of FIG. 1(a) will be referred to as the rear end side with respect to the direction of the axis AX. Also, the upper side of FIG. 1(b) will be referred to as the front end side with respect to the direction of the axis AX, and the lower side of FIG. 1(b) will be referred to as the rear end side with respect to the direction of the axis AX.

As shown in FIGS. 1(a) and 1(b), this spark plug 1 includes a generally rod-shaped center electrode 2; a generally cylindrical insulator 3 surrounding the center electrode 2; a cylindrical metallic shell 4 holding the insulator 3; and a ground electrode 6. One end of the ground electrode 6 is disposed to face the front end surface of the center electrode 2 via a spark discharge gap G, and the other end of the ground electrode 6 is joined to the metallic shell 4.

The metallic shell 4 has a cylindrical shape, and holds the insulator 3 inserted thereinto. A screw portion 9 is formed on the outer circumferential surface of a front end portion of the metallic shell 4. The spark plug 1 is attached to the cylinder head of an unillustrated internal combustion engine by making use of the screw portion 9. In the case where the spark plug 1 is attached to a recent internal combustion engine having an increased output, the nominal diameter of the screw portion 9 is adjusted to, for example, 10 mm or less. The metallic shell 4 may be formed of an electrically conductive steel material, such as low carbon steel.

The center electrode 2 is composed of an outer member 7 and an inner member 8 formed such that the inner material 8 is concentrically embedded at the center of the outer member 7. The center electrode 2 is fixed to the insulator 3 such that its front end portion projects from the front end surface of the insulator 3, whereby the center electrode 2 is held by the metallic shell 4 and is insulated therefrom. The outer member 7 of the center electrode 2 is formed of a Ni-based alloy which is excellent in heat resistance and corrosion resistance. The inner member 8 of the center electrode 2 is formed of a metallic material which is excellent in heat conductivity such as copper (Cu) or nickel (Ni).

In one embodiment, the ground electrode 6 has a prismatic shape. One end of the round electrode 6 is joined to the end surface of the metallic shell 4, and is bent into a generally L-like shape. The shape and configuration of the ground electrode 6 are designed such that a distal end portion of the ground electrode 6 is aligned with the axis of the center electrode 2. Since the ground electrode 6 is designed in this manner, the other end of the ground electrode 6 faces the center electrode 2 via the spark discharge gap G. The spark discharge gap G is a gap between the front end surface of the center electrode 2 and the surface of the ground electrode 6, and is generally set to 0.3 to 1.5 mm. Since the ground electrode 6 is exposed to a higher temperature, as compared with the center electrode 2, preferably, the ground electrode 6 is formed of an Ni-based alloy or the like which is more excellent than the Ni-based alloy of the center electrode 2 in terms of heat resistance corrosion resistance, etc.

The insulator 3 is held by an inner circumferential portion of the metallic shell 4 via talc and/or packing or the like (not shown). The insulator 3 has an axial hole for holding the center electrode 2 along the axis AX of the insulator 3. The insulator 3 is fixed to the metallic shell 4 such that a front end portion of the insulator 3 projects from the front end surface of the metallic shell 4. In the case where the nominal diameter of the screw portion 9 of the metallic shell 4 is adjusted to 10 mm or less, the insulator 3 has a small wall thickness of, for example, 0.7 to 1.0 mm, as measured at the front end surface of the metallic shell 4.

In this spark plug 1, the insulator 3 is formed of an alumina-based sintered material including an Si component, a 2A component, and an RE component.

The alumina-based sintered material contains alumina ($Al_2O_3$) (hereinafter may be referred to as an Al component) as a predominant component. As used herein, the term "predominant component" refers to a component of the highest content. When a sintered material contains an Al component as a predominant component, the sintered material is excellent in withstand voltage characteristic, heat resistance, mechanical strength, etc.

The Al component content of the alumina-based sintered material is preferably 92 mass % to 97 mass % with respect to the total mass of the alumina-based sintered material as 100 mass %, particularly preferably 93 mass % to 96.5 mass %. When the Al component content falls within the aforementioned range, the raw material powder for forming the alumina-based sintered material before sintering has an appropriate sintering aid content. Thus, the alumina-based sintered material produced through sintering this raw material powder has high density. As a result, when the Al component content falls within the aforementioned range, formation of a low-melting-point glass phase and residual pores at the grain boundary is suppressed, whereby the insulator formed from the alumina-based sintered material exhibits an excellent withstand voltage characteristic. As used herein, the Al component content is represented by "oxide-converted mass %," which is obtained by converting the content to "alumina (oxide form) ($Al_2O_3$)."

In the aforementioned alumina-based sintered material, alumina crystal grains present as the Al component have a mean crystal grain size $D_A(Al)$ of, for example, 0.6 to 3.6 μm. As described hereinbelow, alumina crystal grains in the alumina-based sintered material assume a "high-color-density area" in a photograph for image analysis. The mean crystal grain size $D_A(Al)$ of the alumina crystal grains in the alumina-based sintered material may be determined through observation under a scanning electron microscope (SEM), which is similar to the determination method employed in the determination of the crystal grain size $D_E(RE)$ of the below-described RE-β-alumina crystal phase. Specifically, a surface or a certain cross-section of the alumina-based sintered material is mirror-polished, and the polished surface is subjected to thermal etching at a temperature 100° C. lower than the firing temperature for producing the alumina-based sintered material, for 10 minutes. The thus-treated surface is observed under a scanning electron microscope (SEM), and the particle size of a "high-color-density area" is measured through the intercept technique. The high-color-density area is obtained through a "binarization" technique mentioned below. The thus-obtained particle size measurements are arithmetically averaged.

The alumina-based sintered material contains an Si component. The Si component originates from a sintering aid and is present in the alumina-based sintered material in the form of oxide, ion, etc. Generally, the Si component melts during sintering to form a liquid phase; i.e., serves as a sintering aid which promotes densification of the sintered material. After completion of sintering, the Si component forms a low-melting-point glass phase or the like at the alumina crystal grain boundary. However, in the case of the alumina-based sintered material, which contains an Si component and other specific components, the Si component preferentially forms a high-melting-point glass phase or the like with other components, rather than a low-melting-point glass phase. As a result, the alumina-based sintered material exhibits a satisfactory withstand voltage characteristic and excellent mechanical strength.

Thus, in the present invention, the Si component contained in the alumina-based sintered material in such an amount that it virtually forms no low-melting-point glass phase but forms a high-melting-point glass phase or the like with other components. The Si component content of the alumina-based sintered material is preferably 1 mass % to 5 mass % with respect to the total mass of the alumina-based sintered material as 100 mass %, particularly preferably 2 mass % to 5 mass %. As used herein, the Si component content is represented by "oxide-converted mass %," which is obtained by converting the content to "oxide form ($SiO_2$)."

The alumina-based sintered material contains a 2A component. Examples of preferred Group 2 elements include Mg, Ca, Sr, and Ba, from the viewpoint of low toxicity and other factors. In the present invention, the 2A component preferably contains two or more components selected from among the examples. More preferably, the 2A component contains Mg and Ba as essential elements and at least one element other than Mg and Ba among the Group 2 elements; i.e., at least one element selected from the group consisting of a Ca component and an Sr component, so that the alumina-based sintered material exhibits a satisfactory withstand voltage characteristic and sufficient mechanical strength in a high temperature environment exceeding, for example, 700° C. Specifically, in a more preferred embodiment, the 2A component contains an Mg component, a Ba component, and a Ca component; an Mg component, a Ba component, and an Sr component; or an Mg component, a Ba component, a Ca component, and an Sr component. Among them, a 2A component containing an Mg component, a Ba component, and a Ca component is particularly preferred.

The Mg component is originating from a sintering aid and is present in the alumina-based sintered material in the form of oxide, ion, etc. Similar to the Si component, the Mg component also serves as a sintering aid before sintering. The aforementioned Ba component, Ca component, and Sr component are originating from a sintering aid and are present in the alumina-based sintered material in the form of oxide, ion, etc. Similar to the Mg component, these components also serve as a sintering aid before sintering and can enhance the mechanical strength of the produced alumina-based sintered material. Therefore, an alumina-based sintered material which has a 2A component containing at least two Group 2 elements having such functions, particularly, a 2A component formed of an Mg component, a Ba component, and at least one element other than the Mg component and the Ba component, imparts the insulator 3 with a high withstand voltage characteristic and an excellent mechanical strength, can lower the sintering temperature, and can suppress migration at high temperature. The Mg component plays a role in lowering the sintering temperature, and the Ba component plays a role in suppressing migration at high temperature.

The alumina-based sintered material preferably has a total 2A component content of 0.1 mass % to 2.5 mass % with respect to the total mass of the alumina-based sintered material as 100 mass %, particularly preferably 0.8 mass % to 2.2 mass %.

Each component content of the 2A component may be appropriately adjusted so long as each component content does not exceed the total component content of the 2A component, and no particular limitation is imposed on the proportions among the respective component contents. In the present invention, each component content is preferably adjusted to 0 mass % to 2 mass % with respect to the total mass of the alumina-based sintered material as 100 mass %, so that the amounts of said at least two components are not simultaneously 0 mass %. In a particularly preferred embodiment, so that the amounts of said at least two components are not simultaneously 0 mass %, the Mg component content is adjusted to 0.01 mass % to 0.4 mass %, the Ca component content is adjusted to 0.2 mass % to 0.9 mass %, the Sr component content is adjusted to 0.2 mass % to 0.9 mass %, and the Ba component content is adjusted to 0.1 mass % to 1.6 mass %. In the present invention, needless to say, when the alumina-based sintered material contains no Mg component, no Ca component, no Sr component, no Ba component, the total content should be 0 mass %. In the present invention, each 2A-component-forming Group 2 element content is represented by "oxide-converted mass %," which is obtained by converting the content to its oxide form "(2A)O." Specifically, the Mg component content (M) is represented by "oxide-converted mass %," which is obtained by converting the content to its oxide form "MgO," the Ba component content (B) is represented by "oxide-converted mass %," which is obtained by converting the content to its oxide form "BaO," the Ca component content (C) is represented by "oxide-converted mass %," which is obtained by converting the content to its oxide form "CaO," and the Sr component content (Sr) is represented by "oxide-converted mass %," which is obtained by converting the content to its oxide form "SrO." The 2A component content is a total 2A-component-forming component content. Specifically, the 2A component content is the sum of the Mg component content (M), the Ba component content (B), the Ca component content (C), the Sr component content (Sr), etc.

The alumina-based sintered material contains an RE component originating from the sintering aid employed in sintering. The RE component contains Sc, Y, and lanthanoid elements; e.g., an Sc component, a Y component, a La component, a Ce component, a Pr component, an Nd component, a Pm component, an Sm component, an Eu component, a Gd component, a Tb component, a Dy component, an Ho component, an Er component, a Tm component, a Yb component, and an Lu component. The RE component is present in the form of oxide, ion, etc. in the alumina-based sintered material. The RE component, employed in sintering, suppresses excessive grain growth of alumina during sintering and forms an RE-Si glass (rare earth glass) at the grain boundary with the Si component, to thereby elevate the melting temperature of the grain boundary glass phase. Thus, the RE component imparts the insulator 3 with an enhanced withstand voltage characteristic and an enhanced mechanical strength.

The RE component, which may be any of the aforementioned RE components, is preferably at least one component selected from among the group consisting of an La component, a Pr component, and an Nd component. The La component, Pr component, and Nd component are formed of elements (La, Pr, and Nd) having a large ionic radius. Therefore, these components are thought to readily form a high-melting-point crystal phase with an Si component and a crystal phase having an RE-β-alumina structure having a melting point as high as about 2,000° C. with an Al component and, in some cases with a 2A component (hereinafter may be referred to simply as "RE-β-alumina crystal phase"). Thus, when the alumina-based sintered material contains, as an RE component, at least one component selected from among the group consisting of an La component, a Pr component, and an Nd component, an optimum RE-β-alumina crystal phase is effectively formed, and the insulator 3 is imparted with a more enhanced withstand voltage characteristic and a more enhanced mechanical strength. The RE-β-alumina crystal phase is a portion of the alumina-based sintered material which has an RE component/$Al_2O_3$ (wt.) of 0.2 to 2.5.

Thus, the RE-β-alumina crystal phase preferably has a compositional formula: $RE(2A)_x(Al)_yO_z$ (wherein x is 0 to 2.5, y is 11 to 16, and z is 18 to 28). Particularly when the RE component contains at least one component selected from among the group consisting of an La component, a Pr component, and an Nd component, the crystal phase preferably has the above compositional formula. When the RE-β-alumina crystal phase has the compositional formula, the insulator 3 is imparted with a more enhanced withstand voltage characteristic and a more enhanced mechanical strength. In the compositional formula, preferably, x is 0 to 1.5, y is 11 to 14, and z is 18 to 24. Specific examples of the compositional formula of the RE-β-alumina crystal phase include $RE(2A)Al_{13}O_{19}$ and $REAl_{11}O_{18}$.

Whether or not the RE-β-alumina crystal phase has the aforementioned compositional formula may be confirmed through element analysis of the RE-β-alumina crystal phase present in the alumina-based sintered material by means of, for example, an energy dispersive X-ray analyzer (EDX) (product of EDAX, EDX: "Genesis 4000," detector: SUTW3.3RTEM) combined with a transmission electron microscope (TEM) (product of HITACHI, model "HD-2000") under the following measurement conditions.
<Measurement Conditions, Etc.>
(1) Acceleration voltage: 200 kV;
(2) Irradiation mode: HR (spot size: about 0.3 nm); and
(3) Measurements by means of an energy dispersive X-ray analyzer (EDX) calculated as oxide-converted mass %.

The oxide(s) other than the 2A component, RE component, and Al component in an amount (oxide-converted mass %) of 1 mass % or less is/are considered as an impurity/impurities. The total amount of 2A component (by mole), the amount of Al component (by mole), and the theoretical (i.e., in the case of free of oxygen defects) amount of oxygen component (by mole) are represented by x, y, and z, respectively, when the amount of RE component is 1 mol.

No particular limitation is imposed on the site of the presence of the RE-β-alumina crystal phase, so long as the phase is present in the alumina-based sintered material. Preferably, the crystal phase is present from the surface to the inside of the alumina-based sintered material, particularly preferably at the bi-grain boundary and/or triple junctions of alumina crystal grains.

The RE-β-alumina crystal phase may be identified through, for example, X-ray analysis by use of the JCPDS cards. Notably, since no data is found in the JCPDS cards with respect to the RE-β-alumina (RE=Pr or Nd), such a crystal phase cannot be directly identified. However, since the ionic radius of $Pr^{3+}$ and that of $Ne^{3+}$ are almost equivalent to that of $Le^{3+}$, RE-β-alumina (RE=Pr or Nd) exhibits an X-ray diffraction spectrum similar to that of La-β-alumina shown in the JCPDS card of RE-β-alumina (No. 33-699). Thus, Pr-β-alumina, Nd-β-alumina can be identified with reference to the JCPDS card of La-β-alumina.

When the RE-β-alumina crystal phase present in the alumina-based sintered material has a large size (i.e., corresponding to crystal grain size), the mechanical strength of the alumina-based sintered material may be reduced. Thus, in order to impart the insulator 3 with a high mechanical strength, the (grain-size-equivalent) size of the RE-β-alumina crystal phase is essentially controlled in the present invention.

That is, in the present invention, the mean crystal grain size $D_A(RE)$ of the RE-β-alumina crystal phase and that of alumina $D_A(Al)$ essentially satisfy the following relationship (1). Particularly when the RE component contains at least one component selected from among the group consisting of an La component, a Pr component, and an Nd component, the relationship (1) is preferably satisfied. When the relationship (1) is satisfied, the alumina-based sintered material exhibits a higher mechanical strength in a high temperature environment exceeding, for example, 700° C., without lowering the withstand voltage characteristic. In the relationship (1), $D_A(RE)/D_A(Al)$ is more preferably 0.2 to 2, particularly preferably 0.2 to 1.5.

$$0.2 \leq D_A(RE)/D_A(Al) \leq 3.0. \quad \text{Relationship (1):}$$

Also, in the present invention, the alumina-based sintered material preferably includes three or fewer RE-β-alumina crystal phase portions where the crystal grain size $D_E(RE)$ thereof and the mean crystal grain size of alumina $D_A(Al)$ satisfy the following relationship (2). Particularly when the RE component contains at least one component selected from among the group consisting of an La component, a Pr component, and an Nd component, the crystal phase preferably includes three or fewer RE-β-alumina crystal phase portions satisfying the following relationship (2), When the RE-β-alumina crystal phase includes three or fewer RE-β-alumina crystal phase portions satisfying the following relationship (2), the alumina-based sintered material exhibits higher mechanical strength in a high temperature environment exceeding, for example, 700° C., without lowering the withstand voltage characteristic. The RE-β-alumina crystal phase more preferably includes two or fewer RE-β-alumina crystal phase portions satisfying the following relationship (2), particularly preferably one or fewer.

$$D_E(RE)/D_A(Al) \geq 2. \quad \text{Relationship (2):}$$

The crystal grain size $D_E(RE)$ and the mean crystal grain size $D_A(RE)$ may be determined through, for example, the following procedure. Specifically, a surface or a certain cross-section of the alumina-based sintered material is mirror-polished, and the polished surface is subjected to thermal etching at a temperature 100° C. lower than the firing temperature for producing the alumina-based sintered material, for 10 minutes. The thus-treated surface is observed under a scanning electron microscope (SEM), and the photoimage of the observed area (×2,000) is taken. The thus-taken photoimage is subjected to "binarization (also called 2-gradation treatment)" by use of an image-analysis software application "WinROOF" (product of Mitani Corporation) through the following "binarization method" under the following "binarization conditions." As a result, the RE-β-alumina crystal phase is imaged as a "low-color-density area," and alumina is imaged as a "high-color-density area." The crystal grain size $D_E(RE)$ of the RE-β-alumina crystal phase is obtained by calculating the surface area of a "low-color-density areas," assuming that the "low-color-density area" obtained through binarization is one crystal grain of the RE-β-alumina crystal phase, and calculating the circle-equivalent diameter of the "low-color-density area." The mean crystal grain size $D_A(RE)$ of the RE-β-alumina crystal phase is an arithmetic average of the thus-calculated crystal grain size $D_E(RE)$ measurements.

<Binarization Method and Conditions>

(1) In the image (1,280 pixels (horizontal)×1,024 pixels (vertical)) of the surface taken through the treatment, a secondary electron image and a reflected electron image are checked. In the case where the reflected electron image includes a combined low-color-density where two or more "low-color-density areas" adjacent to one another are merged or connected, a line is drawn along the interface between "low-color-density areas" (corresponding to the grain boundary), to thereby clarify the boundary between "low-color-density areas."

(2) For improving the reflected electron image, the reflected electron image is smoothened while the edge of each "low-color-density area" is maintained.

(3) A "threshold value" in binarization is predetermined for exclusively extracting "low-color-density areas" from the reflected electron image. More specifically, from the reflected electron image, brightness values are plotted along the horizontal axis (brightness) and occurrence values along the vertical axis, to thereby obtain a graph. Since the thus-obtained graph has a two-peak profile, the midpoint between the peaks is employed as the "threshold value."

(4) The "low-color-density areas" are extracted from a certain area (40 μm×30 μm) selected from the reflected electron images.

(5) For improving the image quality of the thus-selected area; i.e., the thus-extracted "low-color-density areas," defects shown in the selected areas are restored.

(6) From the images of the selected areas, any "low-color-density area" having a diameter of 10 pixels or less is removed.

(7) Thus, "low-color-density areas" are extracted.

No particular limitation is imposed on the mean crystal grain size $D_A(RE)$ of the RE-β-alumina crystal phase, so long as the aforementioned relationship (1) is satisfied, or the alumina-based sintered material includes three or fewer RE-β-alumina crystal phase portions satisfying the relationship (2). However, the mean crystal grain size $D_A(RE)$ is preferably 0.5 to 5.0 μm, particularly preferably 0.5 to 3.0 μm. When the RE-β-alumina crystal phase has a mean crystal grain size $D_A(RE)$ falling within the aforementioned range, the insulator 3 produced from the alumina-based sintered material exhibits both excellent withstand voltage characteristic and satisfactory mechanical strength.

The RE-β-alumina crystal phase may be formed from RE-β-alumina in the form of raw material powder. However, RE-β-alumina growth occurs considerably anisotropically during firing, thereby possibly inhibiting densification of alumina-based sintered material. Thus, the RE-β-alumina crystal phase is preferably formed through crystallization during firing. In one embodiment, a raw material powder containing the Si component in a specific amount and a raw material powder containing the 2A component in a specific amount are sintered in the presence of the RE component, to thereby form an RE-β-alumina crystal phase via crystallization.

For forming the RE-β-alumina crystal phase satisfying the relationship (1) and/or three or fewer RE-β-alumina crystal phase portions satisfying the relationship (2), a method of modifying the RE component content may be employed. More specifically, by reducing the RE component content, the "$D_A(RE)/D_A(Al)$" (relationship (1)) and the "number of RE-β-alumina crystal phase portions satisfying "$D_E(RE)/D_A(Al) \geq 2$" (relationship (2)) are reduced.

No particular limitation is imposed on the RE component content of the alumina-based sintered material. When the RE component is an La component, a Pr component, or an Nd component, each RE component content may be such an amount that an RE-β-alumina crystal phase is formed. In any case of the La component, the Pr component, and the Nd component, the RE component content is preferably, for example, higher than 0 mass % and 4 mass % or less, with respect to the total mass of the alumina-based sintered material as 100 mass %.

In the present invention, the RE component content of the alumina-based sintered material is represented by "oxide-converted mass %," which is obtained by converting each RE content to its oxide form. Specifically, the Ce component content is represented by "oxide-converted mass %," which is obtained by converting the content to its oxide form "$CeO_2$," the Pr component content is represented by "oxide-converted mass %," which is obtained by converting the content to its oxide form "$Pr_6O_{11}$," and the RE component (other than Ce component and Pr component) content is represented by "oxide-converted mass %," which is obtained by converting the content to its oxide form "$RE_2O_3$." When the RE includes a plurality of RE elements, the RE component content is a total amount of RE elements.

Preferably, the alumina-based sintered material contains the Si component, the 2A component, and the RE component, respectively, in the aforementioned amounts. The sum of the Si component content, 2A component content, and RE component content is preferably 3 mass % to 8 mass %, with respect to the total mass of the alumina-based sintered material as 100 mass %, particularly preferably 3.5 mass % to 7 mass %. When the total content falls within the range, the formed alumina-based sintered material has high density, and the insulator 3 produced from the alumina-based sintered material exhibits a high withstand voltage characteristic.

The alumina-based sintered material contains an Al component, an Si component, a 2A component, and an RE component; i.e., is substantially formed of the Al component, Si component, 2A component, and RE component. As used herein, the term "substantially formed of" refers to no component other than the above components being intentionally added to the sintered material. However, in some cases, each component of the alumina-based sintered material contains unavoidable impurities in small amounts. Although these impurities are preferably removed, complete removal thereof cannot be realized. Thus, the alumina-based sintered material may contain unavoidable impurities in addition to the above components, so long as the objects of the present invention are not impaired. Examples of the unavoidable impurities which may be included in the alumina-based sintered material include alkali metals such as Na; S; and N. The total amount of the unavoidable impurities is preferably small; e.g., 1 part by mass or less, with respect to the total amount of the Al component, Si component, 2A component, and RE component as 100 parts by mass.

As described above, the alumina-based sintered material is substantially formed of the aforementioned components. In addition to the unavoidable impurities, the aforementioned Al component, Si component, 2A component, and RE component, the alumina-based sintered material may further contain other components such as a B component, a Ti component, an Mn component, and an Ni component, each in a small amount.

One preferred embodiment of the RE-β-alumina crystal phase is an RE-β-alumina crystal phase having an unavoidable impurity (particularly alkali metal such as Na) content of 0.01 to 8 wt. % (as converted to oxide). The alkali metal content is an oxide-converted total amount of alkali metals found in circular spots (diameter: 0.3 nm) which are observed in the RE-β-alumina crystal phase under a transmission electron microscope and in which the RE-β-alumina crystal phase is present. When the alumina-based sintered material contains alkali metals found in circular spots (diameter: 0.3 nm), which are observed in the RE-β-alumina crystal phase under a transmission electron microscope and in which the RE-β-alumina crystal phase is present, in an amount of 0.01 to 8 mass %, reduction in withstand voltage characteristic and mechanical strength at high temperature is suppressed, and lowering of the grain boundary phase softening temperature can be prevented.

Since the alumina-based sintered material contains at least an RE component and has an RE-β-alumina crystal phase satisfying the aforementioned relationship (1), the sintered material is thought to have very high density by virtue of a narrow grain size distribution profile. Furthermore, the alumina-based sintered material includes the RE-β-alumina crystal phase serving as a high-melting-point crystal phase in the grain boundary phase, whereby softening of the grain boundary phase at high temperature can be effectively prevented. As a result, the alumina-based sintered material has very few pores, which may serve as fracture origins. Also, since softening of the grain boundary phase is prevented, the insulator 3 produced therefrom exhibits a satisfactory withstand voltage characteristic and sufficient mechanical strength in a high temperature environment exceeding, for example, 700° C.

Therefore, the alumina-based sintered material containing an Si component, a 2A component, and an RE component and having an RE-β-alumina crystal phase satisfying the aforementioned relationship (1) serves as a suitable material of the insulator 3 employed in a spark plug, particularly as a suitable material of the insulator 3 employed in a small-scale spark plug or a spark plug for use in high-output internal combustion engines.

Accordingly, a spark plug having an insulator 3 formed of the alumina-based sintered material can exhibit a satisfactory withstand voltage characteristic and sufficient mechanical strength in a high temperature environment exceeding, for example, 700° C. Therefore, the present invention enables provision of a spark plug which exhibits a satisfactory withstand voltage characteristic and sufficient mechanical strength in a high temperature environment exceeding, for example, 700° C., which is the object of the invention.

The alumina-based sintered material is produced by sintering a raw material powder having the aforementioned compositional proportions. For example, the production of the alumina-based sintered material may include a step of mixing an Al compound powder (generally alumina powder), a rare earth element (RE) compound powder, at least two Group 2 element (2A) compound powders (particularly an Mg compound powder and a Ba compound powder), and a powder of a compound of a Group 2 element (2A) other than Mg and Ba, to thereby prepare a raw material powder; a step of molding the raw material powder, to thereby provide a compact having a specific shape; and a step of firing the compact at 1,450 to 1,650° C. for 1 to 10 hours.

More specifically, firstly, an Al compound powder (generally alumina ($Al_2O_3$) powder), a rare earth element (RE) compound powder, an Si compound powder, and Group 2 element 2A) compound powders are mixed together preferably at specific compositional proportions which are almost the same as the component contents (with respect to the total mass of the raw material powder as 100 mass %) of the produced alumina-based sintered material, the components formed from the compound powders, and the thus-prepared powder is mixed with a hydrophilic binder and a solvent, to thereby prepare a slurry. Alternatively, there may be used a slurry which has been prepared by mixing a powder of the same substance as the Al component, a powder of the same substance as the Si component, a powder of the same substance as the Mg component, a powder of the same substance as the Group 2 element component, and a powder of the same substance as the RE component (these powders may be referred to as raw material powders).

The raw material powders preferably have particle sizes falling within specific ranges. More specifically, in a preferred embodiment, the alumina-based sintered material is produced by mixing an alumina material and a secondary material formed of the Si component, the Mg component, the Group 2 element component, and the RE component in a slurry, molding the granulated product, and firing the compact; and the particle size ratio of mean particle size of the alumina material contained in the slurry to that of the secondary material ($D_{alumina\ material}/D_{secondary\ material}$) satisfies the following relationship: $1.3 \leq (D_{alumina\ material}/D_{secondary\ material}) \leq 4$. When the particle size ratio ($D_{alumina\ material}/D_{secondary\ material}$) satisfies the following relationship: $1.3 \leq (D_{alumina\ material}/D_{secondary\ material}) \leq 4$, more preferably $1.6 \leq (D_{alumina\ material}/D_{secondary\ material}) \leq 3.6$, formation of a coarse RE-β-alumina crystal phase is prevented, to thereby efficiently form an RE-β-alumina crystal phase and ensure favorable sinterability.

No particular limitation is imposed on the Al compound powder, so long as it is aluminum oxide powder (Al component) or a powder of a compound which forms an Al component through firing. Generally, alumina ($Al_2O_3$) powder is employed. Actually, Al compound powder might contain unavoidable impurities (e.g., Na). Therefore, the Al compound powder preferably has high purity, for example, 99.5% or higher. In order to yield a high-density alumina-based sintered material, generally, an Al compound powder having a mean particle size of 0.1 μm to 5.0 μm is preferably employed. The mean particle size is determined through the laser diffraction method (HORIBA, "LA-750").

No particular limitation is imposed on the Si compound powder, so long as it is silicon oxide powder (Si component) or a powder of a compound which forms an Si component through firing. Examples of the Si compound of inorganic powder include Si oxide (including complex oxides), silicon hydroxide, silicon carbonate, silicon chloride, silicon sulfate, silicon nitrate, and silicon phosphate. Specific examples include $SiO_2$ powder. When an Si compound powder other than silicon oxide powder is employed, the amount of the powder is controlled by the unit of its oxide-converted mass %. The purity and mean particle size of the Si compound powder is generally the same as those of the Al compound powder.

No particular limitation is imposed on the Group 2 element (2A) compound powder, so long as it is Group 2 element oxide powder (2A component) or a powder of a compound which forms an 2A component through firing. Examples of the Group 2 element (2A) compound of inorganic powder include Group 2 element (2A) hydroxides, Group 2 element (2A) carbonates, Group 2 element (2A) chlorides, Group 2 element (2A) sulfates, Group 2 element (2A) nitrates, and Group 2 element (2A) phosphates. Specific examples include Mg compound powders such as MgO powder and $MgCO_3$ powder; Ba compound powders such as BaO powder and $BaCO_3$ powder; Ca compound powders such as CaO powder and $CaCO_3$ powder; and Sr compound powders such as SrO powder and $SrCO_3$ powder. When a Group 2 element (2A) compound powder other than its oxide powder is employed, the amount of the powder is controlled by the unit of its oxide-converted mass %. The purity and mean particle size of the Group 2 element (2A) compound powder is generally the same as those of the Al compound powder.

The Group 2 element (2A) compound powder preferably includes at least two Group 2 element (2A) compound powders, more preferably includes an Mg compound powder and a Ba compound powder as essential components and a powder of a compound of at least one element other than the Mg compound powder and the Ba compound powder; i.e., at least one compound powder selected from the group consisting of a Ca compound powder and an Sr compound powder. More preferably, the Group 2 element (2A) compound powder includes an Mg compound powder, a Ba compound powder, and at least one compound powder selected from the group consisting of a Ca compound powder and an Sr compound powder. Particularly preferably, the Group 2 element (2A) compound powder includes an Mg compound powder, a Ba compound powder, and a Ca compound powder.

No particular limitation is imposed on the rare earth element (RE) compound powder, so long as it is RE oxide powder (RE component) or a powder of a compound which forms an RE component through firing. Examples of the rare earth element (RE) compound powder include powders of rare earth element (RE) oxides and complex oxides thereof. When a rare earth element (RE) compound powder other than its oxide powder is employed, the amount of the powder is controlled by the unit of its oxide-converted mass %. The purity and mean particle size of the rare earth element (RE) compound is generally the same as those of the Al compound powder.

Generally, these raw material powders are preferably mixed over 8 hours or longer. When the time of mixing the raw material powders is shorter than 8 hours, a highly uniform powder mixture fails to be formed, thereby possibly failing to yield a high-density sintered material.

Examples of the hydrophilic binder include polyvinyl alcohol, water-soluble acrylic resin, gum arabic, and dextrin, and examples of the solvent include water and alcohols. These hydrophilic binders or solvents may be used singly or in combination of two or more species. The hydrophilic binder may be used in an amount of 0.1 to 5 parts by mass (preferably 0.5 to 3 parts by mass), with respect to 100 parts by mass of the raw material powder. When water is employed as a solvent, the solvent may be used in an amount of 40 to 120 parts by mass (preferably 50 to 100 parts by mass), with respect to 100 parts by mass of the raw material powder.

The mean particle size of the thus-produced slurry may be adjusted to, for example, 1.4 µm to 5.0 µm. Subsequently, the slurry is granulated through, for example, spray drying, to thereby adjust the mean particle size of 50 µm to 200 µm (preferably 70 µm to 150 µm). The mean particle size is determined through the laser diffraction method (HORIBA, "LA-750").

The granulated product is molded to form a compact. If required, the thus-produced compact is worked (cut, polished, etc.) to a desired shape and then fired in air at 1,450 to 1,650° C. (more preferably 1,500 to 1,600° C.) for 1 to 10 hours (more preferably 2 to 8 hours), to thereby yield an alumina-based sintered material. When the firing temperature is lower than 1,450° C., or when the firing time is shorter than one hour, the produced alumina-based sintered material fails to have sufficient density, whereas when the firing temperature is in excess of 1,650° C., or when the firing time is longer than 10 hours, anomalous grain growth of alumina during firing is prone to cause a drop in withstand voltage characteristic and mechanical strength of the produced alumina-based sintered material.

Thus, by modifying the conditions through, for example, the aforementioned methods in the production of the alumina-based sintered material, there can be produced a very high-density alumina-based sintered material having a RE-β-alumina crystal phase which satisfies the relationship (1) and, preferably, further satisfies the relationship (2). The thus-produced alumina-based sintered material exhibits a satisfactory withstand voltage characteristic and sufficient mechanical strength in a high temperature environment exceeding, for example, 700° C. When the RE-β-alumina crystal phase has a composition represented by the aforementioned compositional formula, or when the 2A component contains Mg and Ba as essential elements and at least one element other than Mg and Ba, and the RE component is at least one component selected from the group consisting of an La component, a Pr component, and an Nd component, the produced alumina-based sintered material exhibits a more satisfactory withstand voltage characteristic and greater mechanical strength in a high temperature environment exceeding, for example, 700° C. Thus, the alumina-based sintered material serves as a particularly suitable material of the insulator 3 employed in a spark plug having a small-scale, thin insulator 3, or in a spark plug for use in high-output internal combustion engines. If desired, the shape or the like of the alumina-based sintered material may be re-modified. Through the above-described procedures, the alumina-based sintered material and the insulator 3 of the spark plug 1 formed of the alumina-based sintered material can be produced.

The spark plug 1 may be produced through, for example, the following procedure. Specifically, an electrode material such as an Ni-base alloy is worked to a specific shape, to thereby form the center electrode 2 and/or the ground electrode 6. Preparation and working of the electrode material may be performed sequentially. In one embodiment of the production, a melt of an Ni-base alloy having a composition of interest or a like material is prepared by means of a vacuum melting furnace, and an ingot is prepared from the melt through vacuum casting. The ingot is subjected to appropriate working processes such as hot working and wire drawing, to a shape and dimensions of interest, to thereby form the center electrode 2 and/or ground electrode 6. Alternatively, the inner member 8 is inserted into the cup-formed outer member 7, and the assembly is subjected to plastic working such as extrusion, whereby the center electrode 2 is formed.

Subsequently, one end of the ground electrode 6 is joined, through electric resistance welding or a similar technique, to the end surface of the metallic shell 4 formed through plastic working or the like to a shape of interest and, if required, washing with about 10% HCl, water, etc. is performed. Then, the insulator 3 having a shape and dimensions of interest is formed from the aforementioned alumina-based sintered material, and the center electrode 2 is integrated to the insulator 3 through a known technique. The insulator 3 is integrated into the metallic shell 4 to which the ground electrode 6 has been joined. Then, the front end portion of the ground electrode 6 is bent toward the center electrode 2 so that one end of the ground electrode 6 faces the front end portion of the center electrode 2, whereby the spark plug 1 is produced.

The spark plug according to the present invention is employed as a spark plug in an automotive internal combustion engine such as a gasoline engine. In use, the screw portion 9 is fixed to a predetermined position of a head which defines a combustion chamber of the internal combustion engine (not illustrated) by screwing the portion 9 with an internal thread provided therethrough. The spark plug according to the present invention may be employed in any type of internal combustion engines. Since the alumina-based sintered material forming the insulator 3 can exhibit a satisfactory withstand voltage characteristic and sufficient mechanical strength in a high temperature environment exceeding, for example, 700° C., the spark plug 1 according to the present invention may be suitably employed in, for example, a high-output internal combustion engine which requires a spark plug having a thinned insulator having a nominal diameter of the screw portion 9 adjusted to 10 mm or less.

As described above, the spark plug of the present invention is not limited to the Examples and may be modified, so long as the object of the present invention can be attained. The spark plug 1 is configured so that the front surface of the center electrode 2 faces one end surface of the ground electrode 6, along the axis AX of the center electrode, via the spark discharge gap G. In the present invention, alternatively, the side surface of the center electrode faces one front end surface of the ground electrode along the radial direction of the center electrode via the spark discharge gap. In the latter case, a single ground electrode or a plurality of ground electrodes which face the side surface of the center electrode may be disposed.

The spark plug 1 has the center electrode 2 and the ground electrode 6. In the present invention, a noble metal chip may be disposed on the front end portion of the center electrode and/or the surface of the ground electrode. The noble metal chip which is disposed on the front end portion of the center electrode and the surface of the ground electrode generally has a cylindrical shape with appropriate dimensions and melt-fixed on the front end portion of the center electrode and the surface of the ground electrode through an appropriate welding technique such as laser welding or electric resistance welding. A spark discharge gap is defined by the noble metal chip formed on the front end portion of the center electrode and the noble metal chip formed on the surface of the ground electrode. Examples of the material forming the noble metal chips include noble metal materials such as Pt, Pt alloys, Ir, and Ir alloys.

EXAMPLES

A raw material powder was prepared by weighing and mixing, at predetermined proportions, the following powders: an $Al_2O_3$ powder (mean particle size: 2.2 µm, purity: $\geqq$99.5%) (containing a trace amount of Na (alkali metal) as unavoidable impurity), an $SiO_2$ powder (mean particle size: 2.8 µm, purity: $\geqq$99.5%), an $MgCO_3$ powder (mean particle size: 6.0 µm, purity: $\geqq$99.5%), a $CaCO_3$ powder (mean particle size: 2.0 µm, purity: $\geqq$99.5%), a $BaCO_3$ powder (mean particle size: 5.0 µm, purity: $\geqq$99.5%), an $SrCO_3$ powder (mean particle size: 2.0 µm, purity: $\geqq$99.5%), an $La_2O_3$ powder (mean particle size: 9.0 µm, purity: $\geqq$99.5%), a $CeO_2$ powder (mean particle size: 6.0 µm, purity: $\geqq$99.5%), an $Nd_2O_3$ powder (mean particle size: 4.0 µm, purity: $\geqq$99.5%), and a $Pr_2O_3$ powder (mean particle size: 4.0 µm, purity: $\geqq$ 99.5%).

Each of the thus-prepared raw material powders was placed in a resin pot (capacity: 2.4 L) and pulverized with alumina stones (diameter: 10 mm). To the pulverized raw material powder, a hydrophilic binder was added (2 parts by mass with respect to the pulverized raw material powder (100 parts by mass)) with mixing, to thereby form a slurry. The mean particle size of the slurry was determined through the laser diffraction technique (HORIBA, "LA-750"). TABLE 1 shows the results. The slurry was spray-dried and then granulated to a powder having a mean particle size of about 100 µm as measured through the laser diffraction technique.

The powder formed through granulation was molded through hydrostatic pressing at 100 MPa, to thereby form a compact (diameter: 23 mm) and then fired in air at a predetermined firing temperature for a predetermined firing time, to thereby produce an alumina-based sintered member. The mixing proportions to prepare the raw material powder (raw material powder composition) were virtually coincided with the amounts of respective components in the alumina-based sintered member (oxide-converted mass %) as determined through X-ray fluorescence analysis or chemical analysis.

Figure 3:
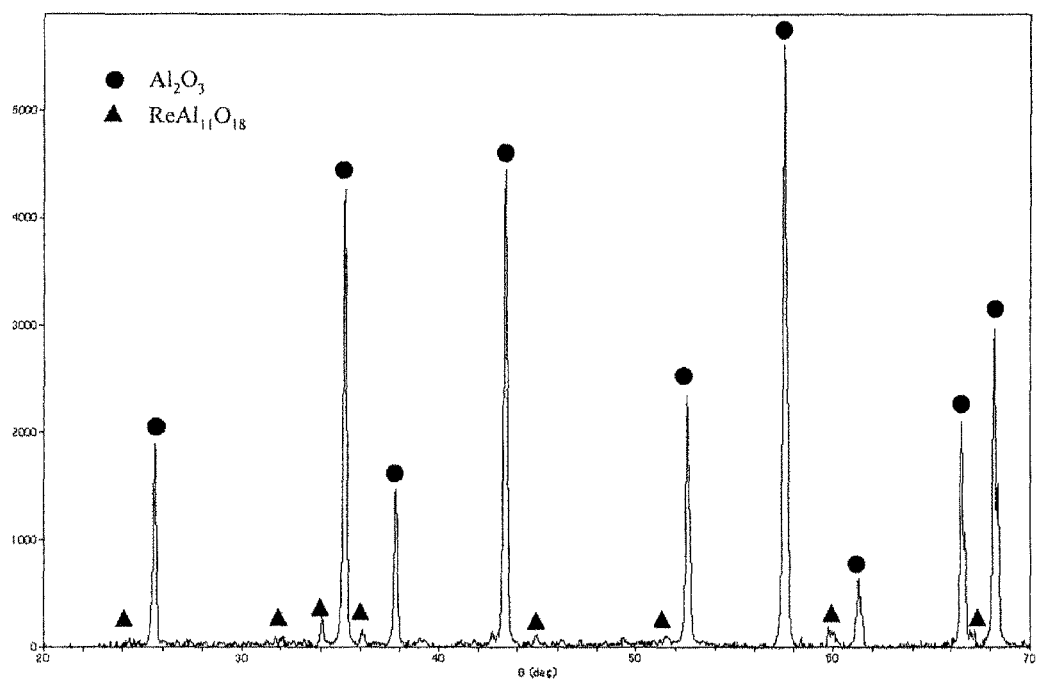
FIG. 3 is an X-ray diffraction chart of an alumina-based sintered material (Example 1) having an La-β-alumina crystal structure type ($LaAl_{11}O_{18}$).

A surface of each of the thus-produced alumina-based sintered members was subjected to X-ray diffraction analysis. The presence or absence of a crystal phase having an La-β-alumina structure was determined by the presence of a spectrum corresponding to the JCPDS card of La-β-alumina (No. 33-699). Also, the presence of a Pr-β-alumina crystal phase, a Ce-β-alumina crystal phase, and an Nd-β-alumina crystal phase was determined with reference to the JCPDS card. TABLE 1 shows the results. FIG. 3 is an X-ray diffraction chart of the alumina-based sintered material (Example 1) having an La-β-alumina crystal structure ($LaAl_{11}O_{18}$).

A surface of each alumina-based sintered member was mirror-polished, and the polished surface was subjected to thermal etching for 10 minutes at a temperature 100° C. lower than the firing temperature. The thus-treated surface was observed under a scanning electron microscope (SEM), and the mean crystal grain size $D_A(Al)$ of alumina was determined through the aforementioned intercept method. Subsequently, "low-color-density areas" were extracted through observation of the surface of each alumina-based sintered member under a scanning electron microscope (SEM). The circle-equivalent diameter of each "low-color-density area" was calculated through the aforementioned procedure, to thereby obtain the crystal grain size $D_E(RE)$ of the RE-β-alumina crystal phase. The arithmetic average of the crystal grain size $D_E(RE)$ measurements was employed as the mean crystal grain size $D_A(RE)$ of the RE-β-alumina crystal phase. From the thus-calculated mean crystal grain size $D_A(Al)$ of alumina, crystal grain size $D_E(RE)$ of the RE-β-alumina crystal phase, and mean crystal grain size $D_A(RE)$ of the RE-β-alumina crystal phase, $D_A(RE)/D_A(Al)$ was calculated, and the number of RE-β-alumina crystal phase portions which satisfies $D_E(RE)/D_A(Al)\geqq 2$ was counted. TABLE 1 shows the results. In TABLE 1, the sign "-" in Comparative Examples 2 and 3 means that calculation could not be done due to absence of the RE-β-alumina crystal phase.

The alumina-based sintered member obtained in Examples 1 to 7 and Comparative Example 1 were subjected to element analysis through observation of the RE-β-alumina crystal phase found in each compact by means of an energy dispersive X-ray analyzer (EDX) combined with a transmission electron microscope (TEM) under the aforementioned measurement conditions, whereby x, y, and z in the aforementioned compositional formula were determined, to thereby confirm the compositional proportions of the RE-β-alumina crystal phase. TABLE 1 shows the results.

TABLE 1

|  | Slurry mean particle size (µm) | Alumina mean particle size (µm) | Secondary material mean particle material size (µm) | Alumina/ secondary material | Mean grain size (µm) $D_A(Al)$ | Mean grain size (µm) $D_A(RE)$ | $D_A(RE)/D_A(Al)$ | No. of crystal grains satisfying $D_A(RE)/D_A(Al)\geqq 2$ | RE-β-alumina crystal phase y/n | x | y | z | Alkali metal content of crystal phase (%) |
|---|---|---|---|---|---|---|---|---|---|---|---|---|---|
| Ex. 1 | 1.55 | 1.55 | 0.90 | 1.72 | 2.0 | 0.6 | 0.30 | 0 | yes | 0 | 11 | 18 | 6.0 |
| Ex. 2 | 1.55 | 1.60 | 1.10 | 1.45 | 1.6 | 4.4 | 2.75 | 3 | yes | 0.9 | 13 | 22 | 0.0 |
| Ex. 3 | 0.90 | 0.90 | 0.50 | 1.80 | 3.6 | 1.7 | 0.47 | 0 | yes | 1.2 | 13 | 23 | 0.0 |
| Ex. 4 | 2.30 | 2.25 | 0.58 | 3.88 | 1.9 | 1.1 | 0.58 | 0 | yes | 2.3 | 16 | 27 | 7.0 |
| Ex. 5 | 0.60 | 0.65 | 0.50 | 1.30 | 0.6 | 1.7 | 2.83 | 3 | yes | 0.6 | 12 | 20 | 0.3 |
| Ex. 6 | 2.30 | 2.25 | 0.80 | 2.81 | 1.8 | 0.8 | 0.44 | 0 | yes | 0.9 | 13 | 22 | 8.0 |
| Ex. 7 | 2.30 | 2.30 | 1.70 | 1.35 | 2.4 | 2.2 | 0.92 | 2 | yes | 1.3 | 14 | 23 | 0.6 |
| Comp Ex. 1 | 1.80 | 1.80 | 1.70 | 1.06 | 1.8 | 6.2 | 3.44 | 7 | yes | 1.1 | 14 | 23 | 0.0 |
| Comp Ex. 2 | 1.55 | 1.55 | 1.90 | 0.82 | 1.7 | — | — | — | no | — | — | — | — |
| Comp Ex. 3 | 2.30 | 2.30 | 2.20 | 1.05 | 2.6 | — | — | — | no | — | — | — | — |

(Withstand Voltage Characteristic)

Figure 2:
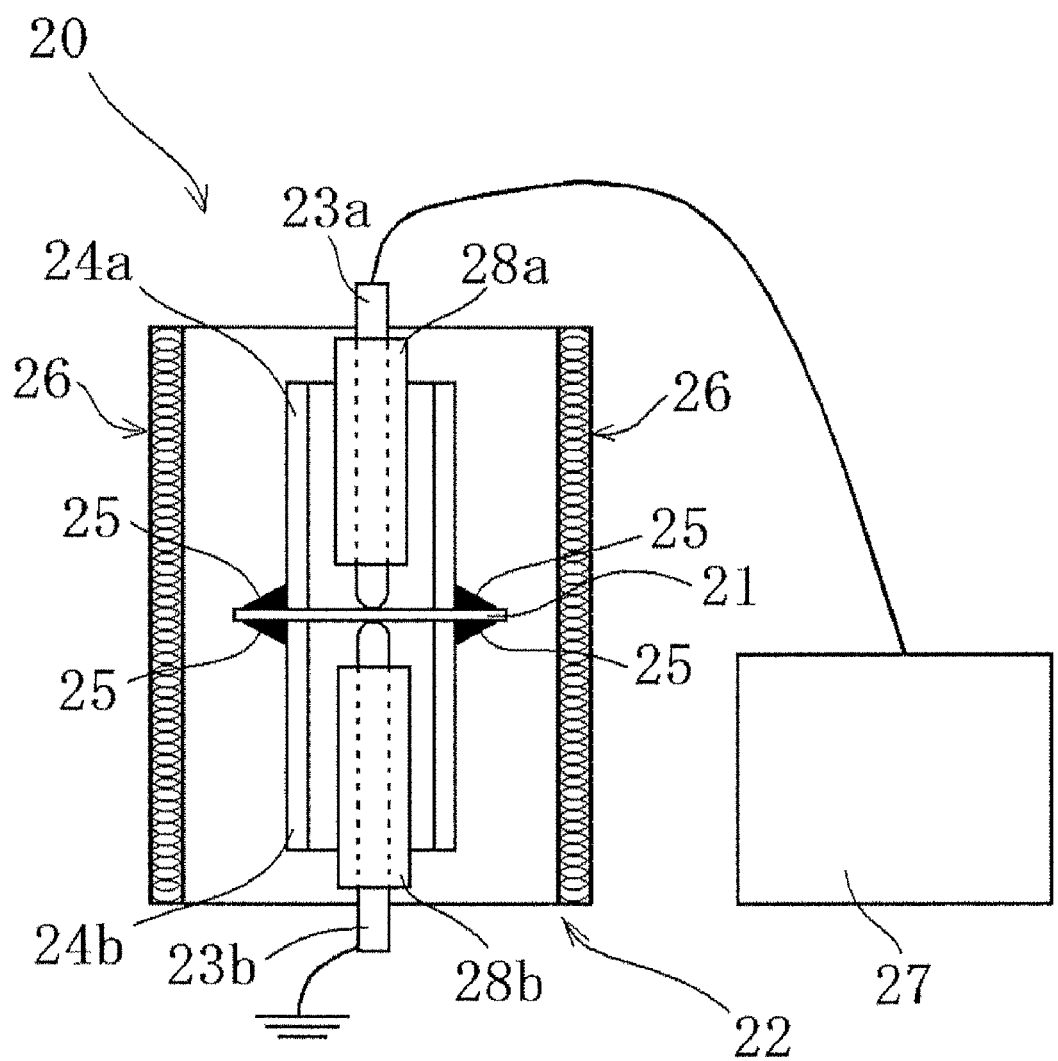
FIG. 2 is a schematic sectional view schematically showing a withstand voltage measurement apparatus.

In a manner similar to that employed in the Examples and Comparative Examples 2 and 3 for producing alumina-based sintered members, disk-like test pieces (diameter: 18 mm, thickness: 0.6 mm) were produced. The withstand voltage of each piece was measured at 700° C. and 800° C. by means of a withstand voltage measuring apparatus 20 shown in FIG. 2. As shown in FIG. 2, in a heating box 22 of the withstand voltage measuring apparatus 20, the disk-like test piece 21 is sandwiched, along the direction of the axis of the disk-like test piece 21, by an electrode 23a connected to a high-voltage-generator (CDI power source) 27 and a ground electrode 23b. Also, the disk-like test piece 21 is sandwiched, along the direction of the axis of the disk-like test piece 21, by alumina ceramic tubes 24a, 24b surrounding the electrode 23a, 23b. In addition, the contact areas between the two surfaces of the disk-like test piece 21 and the alumina ceramic tubes 24a, 24b are fixed with $SiO_2$ sealing glass 25 such that the entire contact areas of the ceramic tubes 24a, 24b are covered with the glass. In each of the electrodes 23a, 23b, the front end portion being in contact with the disk-like test piece 21 has a tapered shape whose diameter gradually decreases toward the front end portion. The contact area with the disk-like test piece 21 was about 0.75 $mm^2$. The outer surface of each of the electrodes 23a, 23b is covered with as alumina ceramic tubes 28a, 28b so as to prevent electric discharge between the heating box 22 and the electrodes. The inside temperature of the heating box 22 was adjusted to 700° C. or 800° C. by means of a electric heater 26, and a predetermined high voltage was applied to the disk-like test piece 21 by means of a high-voltage-generator 27 which enables application of a high voltage (some tens of kV) to the disk-like test piece 21. The voltage at which the disk-like test piece 21 was broken down was measured by means of the withstand voltage measuring apparatus 20, and the voltage value was employed as the "withstand voltage" of the disk-like test piece 21. From the "withstand voltage" values measured at 700° C. and 800° C., the ratio of "withstand voltage" at 800° C. to "withstand voltage" at 700° C. ("drop in withstand voltage" in TABLE 2) was calculated. TABLE 2 shows the "withstand voltage" values measured at 700° C. and 800° C. and values of "drop in withstand voltage."

In a manner similar to that employed in production of the alumina-based sintered member in Comparative Example 1, disk-like test pieces were produced, and the withstand voltage of each piece was measured at 700° C. The withstand voltage of the piece of Comparative Example 1 was 57 kV/mm.

(Mechanical Strength)

In a manner similar to that employed in the Examples and Comparative Examples 2 and 3 for producing alumina-based sintered members, test pieces (48 mm×4 mm×3 mm) were produced. The 3-point bending strength (span: 30 mm) of each test piece was measured at ambient temperature (about 25° C.) and 950° C. according to the method as stipulated in JIS R1604. The 3-point bending strength measured at 950° C. will be referred to as "high-temperature strength." The ratio of "high-temperature strength (950° C.)" to ambient temperature strength ("drop in strength" in TABLE 2) was calculated. TABLE 2 shows measurements of ambient temperature strength and high-temperature strength (950° C.) and those of "drop in strength."

In a manner similar to that employed in production of the alumina-based sintered member in Comparative Example 1, test pieces were produced, and the 3-point bending strength of each test piece was measured at ambient temperature. The strength of the piece of Comparative Example 1 was 360 MPa.

TABLE 2

| | Withstand voltage (kV/mm) | | Drop in withstand voltage | Strength (MPa) | | Drop in strength |
|---|---|---|---|---|---|---|
| | 700° C. | 800° C. | | Ambient temp. | 950° C. | |
| Ex. 1 | 59 | 48 | 0.81 | 480 | 290 | 0.60 |
| Ex. 2 | 57 | 43 | 0.75 | 430 | 220 | 0.51 |
| Ex. 3 | 69 | 45 | 0.65 | 520 | 220 | 0.42 |
| Ex. 4 | 68 | 55 | 0.81 | 490 | 290 | 0.59 |
| Ex. 5 | 58 | 47 | 0.81 | 420 | 230 | 0.55 |
| Ex. 6 | 62 | 51 | 0.82 | 510 | 310 | 0.61 |
| Ex. 7 | 64 | 51 | 0.80 | 460 | 260 | 0.57 |
| Comp Ex. 1 | 57 | — | — | 360 | — | — |
| Comp Ex. 2 | 53 | 35 | 0.66 | 400 | 190 | 0.48 |
| Comp Ex. 3 | 49 | 32 | 0.65 | 390 | 170 | 0.44 |

As is clear from TABLES 1 and 2, the alumina-based sintered materials of Examples 1 to 7, containing an Si component, a 2A component, and an RE component and having an RE-β-alumina crystal phase satisfying the relationship (1), exhibited a withstand voltage at 700° C. of 57 kV/mm or higher. In addition, the alumina-based sintered materials of Examples 1 to 7 exhibited a withstand voltage at 800° C. which was satisfactory for use in practice. The high-temperature strength at 950° C. was also satisfactory for use in practice.

In Examples 1 to 7, the RE-β-alumina crystal phase satisfying the relationship (2) was represented by the aforementioned compositional formula; the 2A component contained Mg and Ba as essential elements and at least one element other than Mg and Ba; and the RE component was an La component, a Pr component, or an Nd component. Therefore, satisfactory withstand voltage at a higher temperature (800° C.) and high-temperature strength (950° C.) can be attained.

In contrast, the alumina-based sintered material of Comparative Example 1, having an RE-β-alumina crystal phase but not satisfying the relationship (1) or (2), exhibited a mechanical strength at ambient temperature as low as 360 MPa. In addition, since the alumina-based sintered material of Comparative Example 1 has an RE-β-alumina crystal phase portions having a larger mean crystal grain size $D_A(RE)$ or crystal grain size $D_E(RE)$ with respect to the mean crystal grain size $D_A(Al)$ of alumina, densification of the alumina-based sintered material is inhibited. Therefore, those skilled in the art can readily understand that satisfactory withstand voltage at a higher temperature (800° C.) or high-temperature strength (950° C.) cannot be attained. The alumina-based sintered material of Comparative Example 2 contains an RE component but has no RE-β-alumina crystal phase, and the alumina-based sintered material of Comparative Example 3 originally contains no RE component. Needless to say, in both cases, the aforementioned relationship (1) or (2) should not attained. Thus, as is clear from TABLES 1 and 2, in Comparative Examples 2 and 3, satisfactory withstand voltage at a higher temperature (800° C.) or high-temperature strength (950° C.) was not attained.

As is clear from TABLES 1 and 2, as compared with the alumina-based sintered materials of Examples 2 and 3, wherein when the RE-β-alumina crystal phase is observed under a transmission electron microscope, a circular spot having a diameter of 0.3 nm in which the RE-β-alumina crystal phase is present does not contain an alkali metal component in an oxide-converted amount of 0.01 to 8 mass %, in the alumina-based sintered materials Examples 1 and 4 to 7, satisfying the above conditions, drops in withstand voltage and high-temperature strength were suppressed upon change in environmental temperature from 700° C. to 800° C.

Also, as is clear from TABLES 1 and 2, as compared with the alumina-based sintered materials of Comparative Examples 1 to 3, wherein the particle size ratio of mean particle size of the alumina material contained in the slurry to that of the secondary material ($D_{alumina\ material}/D_{secondary\ material}$) does not satisfy the following relationship: $1.3 \leq (D_{alumina\ material}/D_{secondary\ material}) \leq 4$, the alumina-based sintered materials of Examples 1 to 7, satisfying the relationship, could effectively form an RE-β-alumina crystal phase satisfying the relationship (1) and (2).

<Production of Spark Plug 1>

Firstly, a wire material (cross-section: 1.6 mm×2.7 mm) serving as a ground electrode 6 was formed through a conventional method from an Ni-based alloy. Separately, a columnar inner member 8 made of copper and a cup shape outer member 7 molded from the Ni-based alloy were provided. The thus-provided inner member 8 was inserted into the outer member 7, and the assembly was subjected to plastic working such as extrusion, to thereby form a center electrode 2 formed of the inner member 8 and the outer member 7, the electrode having a diameter of 4 mm. Then, one end of the ground electrode 6 was joined, through electric resistance welding, to the end surface of the metallic shell 4 formed through plastic working and rolling to a predetermined shape and dimensions (particularly, the nominal diameter of the screw portion was adjusted to 10 mm). In a manner similar to that employed in Examples 1 to 7, an insulator 3 was formed from the alumina-based sintered material. Notably, the insulator 3 was produced by granulating a raw material powder, molding the granular product through hydrostatic pressing, adjusting the shape of the compact before firing, and firing the compact. Then, the center electrode 2 was build in the insulator 3, and the insulator 3 was built in the metallic shell 4 to which the ground electrode 6 had been joined. Then, the front end portion of the ground electrode 6 was bend toward the center electrode 2, so that one end of the ground electrode 6 is disposed to face the front end portion of the center electrode 2, to thereby fabricate a spark plug 1. The thus-fabricated spark plug 1 exhibited the performances as shown in TABLES 1 and 2. Thus, the alumina-based sintered material is a particularly suitable insulator employed, for example, in a spark plug having a small-scale, thin insulator 3 or in a spark plug for use in high-output internal combustion engines. The spark plug having an insulator 3 formed of the alumina-based sintered material exhibited a satisfactory withstand voltage characteristic and sufficient mechanical strength in a high temperature environment exceeding, for example, 700° C., even when the insulator was thin and it was employed in high-output internal combustion engines. In particular, spark plugs having the insulator 3 produced in a manner similar to that employed in Examples 1 to 7 exhibited remarkably high withstand voltage and mechanical strength in addition to the above performance.

Description Of Reference Numerals

| | |
|---|---|
| 1 | spark plug |
| 2 | center electrode |
| 3 | insulator |
| 4 | metallic shell |
| 6 | ground electrode |
| 7 | outer member |
| 8 | inner member |
| 9 | screw portion |
| G | spark discharge gap |
| 20 | withstand voltage measuring apparatus |
| 21 | disk-like test piece |
| 22 | heating box |
| 23a, 23b | electrode |
| 24a, 24b, 28a, 28b | alumina ceramic tube |
| 25 | sealing glass |
| 26 | electric heater |
| 27 | high-voltage-generator (CDI power source) |

The invention claimed is:

1. A spark plug comprising:
a center electrode;
a generally cylindrical insulator surrounding the center electrode; and
a ground electrode disposed such that one end of the ground electrode faces the center electrode via a spark discharge gap,
characterized in that the insulator is formed of an alumina-based sintered material containing an Si component, a Group 2 element component, said Group included in the periodic table defined by Recommendations 1990 presented by the International Union of Pure and Applied Chemistry, or IUPAC (Group 2 may be referred to as Group 2A as previously defined by IUPAC, or as defined by the Chemical Abstracts Service (CAS)), and a rare earth element (RE) component;
that the alumina-based sintered material has an RE-β-alumina crystal phase containing at least the RE component, and
that the mean crystal grain size $D_A(RE)$ of the RE-β-alumina crystal phase and that of alumina $D_A(Al)$ satisfy the following relationship (1):

$$0.2 \leq D_A(RE)/D_A(Al) \leq 3.0.$$

2. A spark plug according to claim 1, wherein
the alumina-based sintered material includes three or fewer RE-β-alumina crystal phase portions where the crystal grain size $D_E(RE)$ thereof and
the mean crystal grain size $D_A(Al)$ of alumina satisfy the following relationship (2):

$$D_E(RE)/D_A(Al) > 2.$$

3. A spark plug according to claim 1, wherein the RE-β-alumina crystal phase is represented by the following compositional formula: $RE(2A)_x(Al)_yO_z$ (wherein x is 0 to 2.5, y is 11 to 16, and z is 18 to 28).

4. A spark plug according to claim 1, wherein, when the RE-β-alumina crystal phase is observed under a transmission electron microscope, a circular spot having a diameter of 0.3 nm in which the RE-β-alumina crystal phase is present contains an alkali metal component in an oxide converted amount of 0.01 to 8mass %.

5. A spark plug according to claim 1, wherein
the alumina-based sintered material is produced by mixing an alumina material and a secondary material formed of the Si component, an Mg component, the Group 2A component, and the RE component in a slurry, molding the granulated product, and firing a compact; and
the particle size ratio of the mean particle size of the alumina material contained in the slurry to that of the secondary material ($D_{alumina\ material}/D_{secondary\ material}$) satisfies the following relationship:

$$1.3 \leq (D_{alumina\ material}/D_{secondary\ material}) \leq 4.$$

6. A spark plug according to claim 1, wherein
the Group 2A component contains Mg and Ba as essential elements and at least one element other than Mg and Ba among elements in Group 2A, and the RE component is at least one member selected from the group consisting of an La component, a Pr component, and an Nd component.

7. A spark plug according to claim 1,
wherein the insulator is held by a metallic shell, and
a screw portion formed around the outer surface of said metallic shell has a nominal diameter of 10 mm or smaller.

8. A spark plug according to claim 2, wherein the RE-β-alumina crystal phase is represented by the following compositional formula: $RE(2A)_x(Al)_yO_z$, (wherein x is 0 to 2.5, y is 11 to 16, and z is 18 to 28).

9. A spark plug according to claim 2, wherein, when the RE-β-alumina crystal phase is observed under a transmission electron microscope, a circular spot having a diameter of 0.3 nm in which the RE-β-alumina crystal phase is present contains an alkali metal component in an oxide-converted amount of 0.01 to 8 mass %, 10. A spark plug according to claim 3, wherein, when the RE-β-alumina crystal phase is observed under a transmission electron microscope, a circular spot having a diameter of 0.3 nm in which the RE-β-alumina crystal phase is present contains an alkali metal component in an oxide-converted amount of 0.01 to 8 mass %.

11. A spark plug according to claim 2, wherein
the alumina-based sintered material is produced by mixing an alumina material and a secondary material formed of the Si component, an Mg component, the Group 2A component, and the RE component in a slurry, molding the granulated product, and firing a compact; and
the particle size ratio of the mean particle size of the alumina material contained in the slurry to that of the secondary material ($D_{alumina\ material}/D_{secondary\ material}$) satisfies the following relationship:

$$1.3 \leq (D_{alumina\ material}/D_{secondary\ material}) \leq 4.$$

12. A spark plug according to claim 3, wherein
the alumina-based sintered material is produced by mixing an alumina material and a secondary material formed of the Si component, an Mg component, the Group 2A component, and the RE component in a slurry, molding the granulated product, and firing a compact; and
the particle size ratio of the mean particle size of the alumina material contained in the slurry to that of the secondary material ($D_{alumina\ material}/D_{secondary\ material}$) satisfies the following relationship:

$$1.3 \leq (D_{alumina\ material}/D_{secondary\ material}) \leq 4.$$

13. A spark plug according to claim 4, wherein
the alumina-based sintered material is produced by mixing an alumina material and a secondary material formed of the Si component, an Mg component, the Group 2A component, and the RE component in a slurry, molding the granulated product, and firing a compact; and
the particle size ratio of the mean particle size of the alumina material contained in the slurry to that of the secondary material ($D_{alumina\ material}/D_{secondary\ material}$) satisfies the following relationship:

$$1.3 \leq (D_{alumina\ material}/D_{secondary\ material}) \leq 4.$$

14. A spark plug according to claim 2, wherein
the Group 2A component contains Mg and Ba as essential elements and at least one element other than Mg and Ba among elements in Group 2A, and
the RE component is at least one member selected from the group consisting of an La component, a Pr component, and an Nd component.

15. A spark plug according to claim 3, wherein
the Group 2A component contains Mg and Ba as essential and at least one element other than Mg and Ba among elements in Group 2A, and
the RE component is at least one member selected from the group consisting of an La component, a Pr component, and an Nd component.

16. A spark plug according to claim 4, wherein
the Group 2A component contains Mg and Ba as essential elements and at least one element other than Mg and Ba among elements in Group 2A, and
the RE component is at least one member selected from the group consisting of an La component, a Pr component, and an Nd component.

17. A spark plug according to claim 5, wherein
the Group 2A component contains Mg and Ba as essential and at least one element other than Mg and Ba among elements in Group 2A, and
the RE component is at least one member selected from the group consisting of an La component, a Pr component, and an Nd component.

18. A spark plug according to claim 2, wherein
the insulator is held by a metallic shell, and
a screw portion formed around the outer surface of the metallic shell has a nominal diameter of 10 mm or smaller.

19. A spark plug according to claim 3, wherein
the insulator is held by a metallic shell, and
a screw portion formed around the outer surface of the metallic shell has a nominal diameter of 10 mm or smaller.

20. A spark plug according to claim 4, wherein
the insulator is held by a metallic shell, and
a screw portion formed around the outer surface of the metallic shell has a nominal diameter of 10 mm or smaller.

21. A spark plug according to claim 5, wherein
the insulator is held by a metallic shell, and
a screw portion formed around the outer surface of the metallic shell has a nominal diameter of 10 mm or smaller.

22. A spark plug according to claim 6, wherein
the insulator is held by a metallic shell, and
a screw portion formed around the outer surface of the metallic shell has a nominal diameter of 10 mm or smaller.

* * * * *